United States Patent
Jaakola et al.

(10) Patent No.: US 9,710,533 B2
(45) Date of Patent: Jul. 18, 2017

(54) EFFICIENT BUFFER POOL PAGE PRE-FETCHING FOR DATABASE CLUSTERS

(71) Applicant: Codership Oy, Helsinki (FI)

(72) Inventors: Seppo Jaakola, Helsinki (FI); Teemu Ollakka, Oulu (FI); Alexey Yurchenko, Helsinki (FI)

(73) Assignee: Codership Oy, Helsinki (FI)

( * ) Notice: Subject to any disclaimer, the term of this patent is extended or adjusted under 35 U.S.C. 154(b) by 288 days.

(21) Appl. No.: 14/730,434

(22) Filed: Jun. 4, 2015

(65) Prior Publication Data

US 2016/0357779 A1    Dec. 8, 2016

(51) Int. Cl.
G06F 17/30    (2006.01)

(52) U.S. Cl.
CPC .... *G06F 17/30575* (2013.01); *G06F 17/3048* (2013.01); *G06F 17/30578* (2013.01)

(58) Field of Classification Search
None
See application file for complete search history.

(56) References Cited

U.S. PATENT DOCUMENTS 8,666,939 B2 * 3/2014 O'Krafka .......... G06F 17/30578
                                                    707/615
2006/0004858 A1    1/2006 Tran et al.
2006/0031450 A1    2/2006 Unrau et al.
2009/0037507 A1    2/2009 Rosman et al.
2011/0302242 A1    12/2011 Kim et al.
2014/0044015 A1    2/2014 Chen et al.
2014/0348087 A1    11/2014 Wu et al.
2016/0055257 A1 *  2/2016 Sinha .................. G06F 17/3056
                                                    707/770

OTHER PUBLICATIONS

MongoDB, Versions, accesed May 16, 2017 at https://jira.mongodb.org/browse/SERVER?selectedTab=com.atlassian.jira.jira-projects-plugin:versions-panel&subset=-1.*
MongoDB, Replica Set Data Synchronization, accessed May 16, 2017 at https://jira.mongodb.org/browse/SERVER?selectedTab=com.atlassian.jira.jira-projects-plugin:versions-panel&subset=-1.*

* cited by examiner

*Primary Examiner* — William Spieler
(74) *Attorney, Agent, or Firm* — Ziegler IP Law Group, LLC

(57) ABSTRACT

A method for use in a database cluster is provided. A first transaction is received at a first node of the database cluster. A page pre-fetch request corresponding to the first transaction is generated while executing the first transaction at the first node. The page pre-fetch request is indicative of at least one database page that is referenced by the first transaction. Moreover, the page pre-fetch request is added to a replication write-set of a second transaction at the first node. Subsequently, the replication write-set of the second transaction, along with the page pre-fetch request, is communicated to a second node of the database cluster.

23 Claims, 9 Drawing Sheets

EFFICIENT BUFFER POOL PAGE PRE-FETCHING FOR DATABASE CLUSTERS

TECHNICAL FIELD

The present disclosure generally relates to data synchronization, and more specifically, to methods for use in database clusters. Moreover, the present disclosure relates to computing apparatus for use in database clusters. Furthermore, the present disclosure also concerns computer program products comprising non-transitory machine-readable data storage media having stored thereon program instructions that, when accessed by processing devices of database clusters, cause the processing devices to perform the aforesaid methods.

BACKGROUND

A typical database cluster includes a plurality of database servers, which are often distributed geographically. In the database cluster, the database servers communicate with each other for data replication and data synchronization purposes. The term "data replication" typically refers to electronic copying of data from one computer or server to other computers or servers. Data replication and data synchronization enable users to access a same level of information and to access data relevant to their tasks without interfering with tasks of other users.

Conventionally, a database server reserves a space in its system memory to perform operations on data. This reserved space is called by different names in different database management systems (DBMS), but is generally called a "buffer pool". If the data does not fit fully in a buffer pool, a DBMS in a course of operation will have to replace unneeded database pages in the buffer pool with needed database pages from the data stored on a persistent storage device (hereinafter referred to as "buffer pool page replacement").

Buffer pool page replacement is a very expensive operation. Firstly, storage device access latencies are orders of magnitude higher than memory access latencies, while storage device access throughput is orders of magnitude lower than memory access throughput. Secondly, as there is no generally efficient way to cache data, the needed database pages have to be read from the storage device. Therefore, for dedicated database servers, system administrators often try to make their buffer pool as large as possible to reduce a need for page replacements.

However, data size often significantly exceeds a buffer pool capacity, which is typically limited by an available memory size. As a consequence, buffer pool page replacement is a common situation in most practical implementations.

Moreover, buffer pool page replacement poses a severe problem during database replication at slave servers. When a transaction is replicated from a master server to a slave server, following happens:
(i) the master server has already fetched all required database pages from its storage device into its buffer pool and has completed the transaction, and
(ii) the slave server only now starts to apply the transaction and fetch required database pages from its storage device.

Thus, the master server has already performed most of its computation-intensive work, while the slave server still needs to fetch the required database pages to modify them according to results of the master server. As a result, the slave server starts to lag behind the master server, and buffer pool page replacement is a major contributing factor to it.

There exists some conventional techniques that attempt to solve the abovementioned problem. These conventional techniques involve pre-fetching database pages into a buffer pool for already replicated transactions that reside in a slave server's staging area waiting to be applied in its DBMS. However, this type of pre-fetching is effective only when the slave server is already lagging behind and a queue of incoming replication transactions is long enough to allow time for the pre-fetching.

SUMMARY

The present disclosure seeks to provide an improved method for use in a database cluster. The present disclosure seeks especially to provide an improved method for buffer pool page prefetching for use in a database cluster.

A further aim of the present disclosure is to at least partially overcome at least some of the problems of the prior art, as discussed above.

In a first aspect, embodiments of the present disclosure provide a method for use in a database cluster, wherein the database cluster comprises a plurality of nodes, the method comprising:
receiving a first transaction at a first node of the database cluster;
generating a page pre-fetch request corresponding to the first transaction whilst executing the first transaction at the first node, wherein the page pre-fetch request is indicative of at least one database page that is referenced by the first transaction;
adding the page pre-fetch request to a replication write-set of a second transaction at the first node; and
communicating the replication write-set of the second transaction, along with the page pre-fetch request, to a second node of the database cluster.

In a second aspect, embodiments of the present disclosure provide a method for use in a database cluster, wherein the database cluster comprises a plurality of nodes, the method comprising:
receiving, at a second node of the database cluster, a page pre-fetch request corresponding to a first transaction along with a replication write-set of a second transaction;
determining, from the page pre-fetch request, at least one database page that is referenced by the first transaction;
determining whether or not the at least one database page already exists in a buffer pool at the second node; and
pre-fetching the at least one database page into the buffer pool when the at least one database page does not exist in the buffer pool.

In a third aspect, embodiments of the present disclosure provide a computing apparatus comprising:
a processor;
a memory coupled to the processor; and
a network interface coupled to the processor,
wherein the processor is configured to:
receive a first transaction;
generate a page pre-fetch request corresponding to the first transaction whilst executing the first transaction, wherein the page pre-fetch request is indicative of at least one database page that is referenced by the first transaction;
add the page pre-fetch request to a replication write-set of a second transaction; and communicate the replication write-set of the second transaction, along with the page pre-fetch request, to at least one node of a database cluster.

In a fourth aspect, embodiments of the present disclosure provide a computing apparatus comprising:

a processor;

a memory coupled to the processor; and a network interface coupled to the processor, wherein the processor is configured to:

receive a page pre-fetch request corresponding to a first transaction along with a replication write-set of a second transaction;

determine, from the page pre-fetch request, at least one database page that is referenced by the first transaction;

determine whether or not the at least one database page already exists in a buffer pool; and pre-fetch the at least one database page into the buffer pool when the at least one database page does not exist in the buffer pool.

In a fifth aspect, embodiments of the present disclosure provide a computer program product comprising a non-transitory machine-readable data storage medium having stored thereon program instructions that, when accessed by a processing device of a database cluster, cause the processing device to:

receive a first transaction;

generate a page pre-fetch request corresponding to the first transaction whilst executing the first transaction, wherein the page pre-fetch request is indicative of at least one database page that is referenced by the first transaction;

add the page pre-fetch request to a replication write-set of a second transaction; and communicate the replication write-set of the second transaction, along with the page pre-fetch request, to at least one node of the database cluster.

Embodiments of the present disclosure substantially eliminate or at least partially address the aforementioned problems in the prior art, and enable slave nodes to pre-fetch database pages into their respective buffer pools for use in near future.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
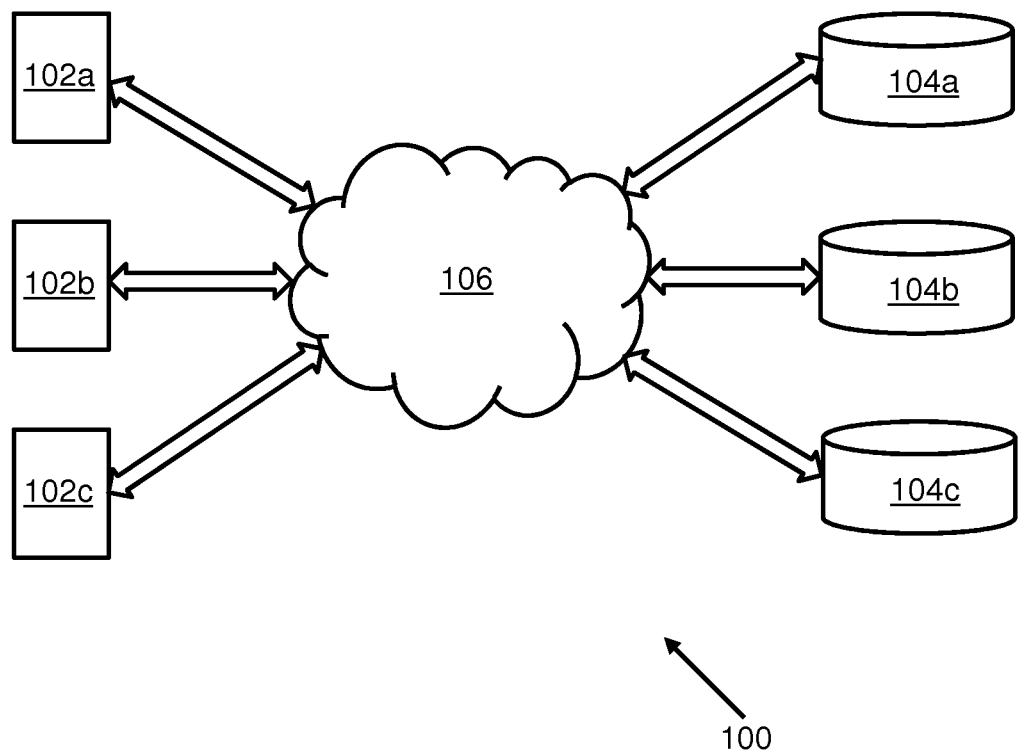
FIG. 1 is a schematic illustration of an example network environment in which a multi-master database cluster is implemented pursuant to the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Glossary

Brief definitions of terms used throughout the present disclosure are given below.

The term "database" generally refers to an organized collection of machine-readable data.

The term "Database Management System (DBMS)" generally refers to a software application specially designed to manage and manipulate resources in a database. The DBMS provides an interface, such as an Application Programming Interface (API) or a Structured Query Language (SQL) for performing basic database operations, such as create, read, update, and delete (often referred to as CRUD).

The term "database cluster" generally refers to a plurality of database servers or nodes, wherein each database server or node includes a DBMS. Each node resides in its own process space and may reside on the same server or different servers. Each node maintains a copy of a portion or all of resources from other nodes within the database cluster. The nodes are configured to communicate with other nodes, in order to synchronize the resources such that all copies of a particular resource contain the same data.

The term "master node" generally refers to a node in a database cluster to which a client makes a connection, while the term "slave node" generally refers to other nodes in the database cluster for the connection.

The term "transaction" generally refers to a set of one or more data operations that are grouped together, such that either all of these operations execute and have their corresponding results committed, or none of these results are committed. A transaction is typically executed in two phases. In a first phase, all operations in the transaction are executed, and the results are saved in a temporary storage. In a second phase, the results are written to databases within a database cluster. The second phase of writing the results to the databases is often referred to as committing the transaction. After the first phase is completed, a determination can be made as to whether or not it is desired to commit the transaction. In case of a conflict of synchronization, the transaction is rolled back, i.e., the temporary results are discarded and the databases are not modified.

The term "database page" generally refers to a fundamental unit of data storage in a DBMS. Typically, a database page stores table and index data. When a database operation is performed, an entire database page is read and/or written.

The term "buffer pool" generally refers to a memory cache that is used for caching database pages. Accessing database pages from a buffer pool is faster than accessing database pages from a storage device. Therefore, use of buffer pools improves a response time for data retrieval in a database cluster. Typically, a buffer pool is maintained at each node of a database cluster.

The term "page pre-fetch request" generally refers to a request that is sent from a master node to a slave node to enable the slave node to pre-fetch into its buffer pool at least one database page referenced by a given transaction.

The term "source transaction identifier" generally refers to a parameter specific to a page pre-fetch request that uniquely identifies a transaction to which the page pre-fetch request corresponds.

The term "page pre-fetch cache" generally refers to a cache, maintained at a master node, for caching page pre-fetch requests that are required to be sent to slave nodes.

The term "client" generally refers to an application, program, process or device in a client/server relationship that requests information or services from another program, process or device (a server) on a communication network Importantly, the terms "client" and "server" are relative since an application may be a client to one application but a server to another. The term "client" also encompasses software that makes the connection between a requesting application, program, process or device to a server possible, such as an FTP client.

The term "server" generally refers to an application, program, process or device in a client/server relationship that responds to requests for information or services by another program, process or device (a client) on a communication network. The term "server" also encompasses software that makes the act of serving information or providing services possible.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the present disclosure provided herein, one of ordinary skill in the art will appreciate a variety of ways in which connection or coupling exists in accordance with the aforementioned definition.

The phrases "in an embodiment," "in accordance with an embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

If the specification states a component or feature "may", "can", "could", or "might" be included or have a characteristic, that particular component or feature is not required to be included or have the characteristic.

EMBODIMENTS OF THE PRESENT DISCLOSURE

In a first aspect, embodiments of the present disclosure provide a method for use in a database cluster, wherein the database cluster comprises a plurality of nodes, the method comprising:

receiving a first transaction at a first node of the database cluster;

generating a page pre-fetch request corresponding to the first transaction whilst executing the first transaction at the first node, wherein the page pre-fetch request is indicative of at least one database page that is referenced by the first transaction;

adding the page pre-fetch request to a replication write-set of a second transaction at the first node; and communicating the replication write-set of the second transaction, along with the page pre-fetch request, to a second node of the database cluster.

It is to be noted herein that the first node and the second node are a master node and a slave node, respectively, for the first and second transactions. The aforementioned method represents steps performed at the master node. These steps can be implemented in hardware, software, or a combination thereof.

Optionally, page pre-fetch requests are generated for all data operations, namely for both read and write access operations. Alternatively, optionally, page pre-fetch requests are generated for write access operations only.

It will be appreciated that read access typically precedes write access in transaction processing. Therefore, generating page pre-fetch requests for read access operations would fasten pre-fetching in slave nodes. However, not all database pages referenced by read access operations at a master node are required at the slave nodes. Therefore, some page pre-fetch requests generated for read access operations potentially cause excessive pre-fetching of database pages into buffer pools at the slave nodes.

According to an embodiment, the method further comprises communicating a replication write-set of the first transaction to the second node, wherein the replication write-set of the first transaction is communicated after the replication write-set of the second transaction is communicated. As a result, the page pre-fetch request corresponding to the first transaction is communicated before the replication write-set of the first transaction is communicated. This enables the second node to pre-fetch the at least one database page into its buffer pool for use in near future, namely when the replication write-set of the first transaction is received and is applied at the second node.

According to an embodiment, the page pre-fetch request comprises a source transaction identifier of the first transaction.

According to an embodiment, the method further comprises:

maintaining a page pre-fetch cache at the first node, wherein the page pre-fetch cache stores page pre-fetch requests that are generated during execution of transactions received at the first node;

fetching from the page pre-fetch cache at least one page pre-fetch request to be added to a replication write-set of a given transaction;

adding the at least one page pre-fetch request to the replication write-set of the given transaction; and communicating the replication write-set of the given transaction, along with the at least one page pre-fetch request, to the second node.

Moreover, in this embodiment, the method further comprises removing the at least one page pre-fetch request from the page pre-fetch cache to free space after the at least one page pre-fetch request has been added to the replication write-set of the given transaction.

There might arise a situation when the page pre-fetch cache becomes too large, for example possibly when a large number of transactions are in a query-processing state at the first node at substantially the same time. For an optimal usage of available resources, the page pre-fetch cache can be configured for a fixed limit Optionally, when page pre-fetch requests are generated at a fast rate, such that a size or a number of page pre-fetch requests to be stored in the page pre-fetch cache exceeds the fixed limit, at least one of following operations can be performed:

(i) at least some of newly generated page pre-fetch requests are rejected, and consequently, are not stored in the page pre-fetch cache, and/or (ii) at least some of older page pre-fetch requests are removed from the page pre-fetch cache to free some space.

Moreover, it is to be noted here that any number of page pre-fetch requests can be added to a single replication write-set. In some examples, a single replication write-set may include a single page pre-fetch request. In other examples, a single replication write-set may include a plurality of page pre-fetch requests.

Furthermore, according to an embodiment, the page pre-fetch request comprises pre-fetch information and/or instructions for pre-fetching the at least one database page into a buffer pool (hereinafter referred to as "pre-fetch instructions"). Optionally, the pre-fetch information and/or instructions comprise a page identifier of the at least one database page. Alternatively, optionally, the pre-fetch information and/or instructions comprise at least one database key value that identifies the at least one database page.

The second node uses the pre-fetch instructions to address a corresponding database page in its database table space. In some cases, using the page identifier of the at least one database page would be an optimal choice. However, there might arise situations when page topologies do not have a one-to-one mapping between the first node and the second node. In other words, database pages in the first and second nodes may not be equal in content and/or may not share same page identifiers. In such situations, using a database key value that identifies the at least one database page would be an optimal choice.

When database key values are used for pre-fetch instructions, there might arise a situation when multiple page pre-fetch requests are generated for a same database page. Such a situation can possibly arise when the page pre-fetch requests are generated at a master node for multiple database key values whose corresponding database rows reside in a same database page. However, such a situation would not have an adverse effect at a slave node, as processing of only a first page pre-fetch request would result in a disk operation for pre-fetching the database page, while processing of subsequent page pre-fetch requests would determine that the same database page already exists in the buffer pool.

Optionally, in this regard, the method further comprises filtering out database key values that reside in the same database page in the first node. As an example, a given database key value residing in a particular database page is filtered out if it is determined that a page pre-fetch request including another database key value in that particular database page has already been populated in the page pre-fetch cache.

It is to be noted here that as page topologies may not be identical in the first and second nodes, the aforementioned filtering may result in filtering out all database key values that reside in a same database page in the second node and/or sending more than one page pre-fetch requests that result in fetching a same database page in the second node. It will be appreciated that both these anomalies are not fatal, and the aforementioned filtering only optimizes a traffic flow of page pre-fetch requests to the second node.

In a second aspect, embodiments of the present disclosure provide a method for use in a database cluster, wherein the database cluster comprises a plurality of nodes, the method comprising:

receiving, at a second node of the database cluster, a page pre-fetch request corresponding to a first transaction along with a replication write-set of a second transaction;

determining, from the page pre-fetch request, at least one database page that is referenced by the first transaction;

determining whether or not the at least one database page already exists in a buffer pool at the second node; and pre-fetching the at least one database page into the buffer pool when the at least one database page does not exist in the buffer pool.

Later, when a replication write-set of the first transaction is received at the second node, the at least one database page referenced by the first transaction is already present in the buffer pool.

It is to be noted herein that the second node is a slave node for the first and second transactions. The aforementioned method represents steps performed at the slave node. These steps can be implemented in hardware, software, or a combination thereof.

Moreover, the at least one database page is determined from pre-fetch instructions included in the page pre-fetch request. The pre-fetch instructions include either a page identifier of the at least one database page or a database key value that identifies the at least one database page.

Optionally, when the pre-fetch instructions include the database key value, a DBMS data manager at the second node is consulted to translate the database key value to a page identifier of the at least one database page. Subsequently, the page identifier is used to pre-fetch the at least one database page into the buffer pool.

According to an embodiment, the page pre-fetch request comprises a source transaction identifier of the first transaction. In this embodiment, the method further comprises determining, from the source transaction identifier of the first transaction, whether or not the first transaction is already applied at the second node. As an example, the first transaction may have already been applied at the second node in a situation when generation and communication of page pre-fetch requests is slower than transaction replication. Beneficially, the at least one database page is pre-fetched into the buffer pool when the first transaction has not been applied at the second node. This prevents unnecessary pre-fetching of the at least one database page when the first transaction is already applied at the second node.

Optionally, in this regard, the method further comprises:
maintaining a lookup table of transactions that are already applied at the second node, wherein the lookup table stores source transaction identifiers of the transactions that are already applied at the second node; and
looking up for the source transaction identifier of the first transaction in the lookup table to determine whether or not the first transaction is already applied at the second node.

Optionally, the lookup table is configured for a fixed size. Optionally, the lookup table is implemented by way of a ring buffer. It is to be noted here that in a situation when generation and communication of page pre-fetch requests is slower than transaction replication, information about an already applied transaction may be missed due to the fixed size of the lookup table. However, it will be appreciated that missing information about the already applied transaction is not fatal, as the second node will have to just perform extra work to pre-fetch a database page, which would later turn out to be unnecessary.

Moreover, according to an embodiment, the method further comprises processing the page pre-fetch request in a thread-safe manner. As an example, when a plurality of database pages are required to be pre-fetched into the buffer pool, multi-threading is used, namely multiple threads are implemented to pre-fetch the database pages.

For illustration purposes only, there will now be considered an example of how the aforementioned methods can be executed in a database cluster. In the example, let us consider that the database cluster includes three nodes, namely nodes A, B and C, and that a client opens a connection to the node B and initiates a first transaction via the connection. It is to be noted that clients can open connections to any of the nodes A, B and C. A node where a client is connected operates as a master node for that connection, while other nodes operate as slave nodes for that connection. In the example herein, the node B operates as a master node for the first transaction, while the nodes A and C operate as slave nodes for the first transaction.

The client sends data pertaining to the first transaction to the node B. Upon receiving the data, the node B executes the first transaction. Whilst executing the first transaction, the node B determines at least one database page that is referenced by the first transaction.

Subsequently, the node B generates a page pre-fetch request corresponding to the first transaction. In this regard, the node B includes within the page pre-fetch request a page identifier of the at least one database page or at least one database key value that identifies the at least one database page.

Moreover, the node B includes within the page pre-fetch request a source transaction identifier of the first transaction. The source transaction identifier uniquely identifies the transaction to which the page pre-fetch request corresponds, namely the first transaction.

Optionally, the source transaction identifier is a Global Transaction IDentifier (GTID). GTID's are typically used to globally order transactions in the database cluster.

Optionally, the source transaction identifier includes a node identifier for identifying a particular node from which the page pre-fetch request originated, namely a node identifier of the node B. In an example, the node identifier of the node B can be a Universally Unique Identifier (UUID) of the node B.

Moreover, optionally, the source transaction identifier also includes a transaction number determined by an order in which the first transaction is committed on the node B.

In the illustrated example, the page pre-fetch request originated from the node B. As an example, the page pre-fetch request may be assigned "B: 7" as the source transaction identifier, wherein "B" indicates that the page pre-fetch request originated from the node B, while "7" indicates a transaction number corresponding to the first transaction.

Upon generating the page pre-fetch request, the node B then stores the page pre-fetch request at a page pre-fetch cache maintained at the node B.

In this manner, the node B generates page pre-fetch requests for all ongoing transactions, namely transactions being executed in a query-processing state at the node B. The node B then stores the page pre-fetch requests so generated at its page pre-fetch cache.

When creating a replication write-set of a second transaction, the node B fetches at least one page pre-fetch request from its page pre-fetch cache and adds the at least one page pre-fetch request to the replication write-set of the second transaction. The node B then sends the replication write-set of the second transaction along with the at least one page pre-fetch request to the nodes A and C. Subsequently, the node B removes the at least one page pre-fetch request from its page pre-fetch cache.

Furthermore, upon receiving the replication write-set of the second transaction along with the at least one page pre-fetch request, the nodes A and C apply the replication write-set of the second transaction at their respective databases as usual. For the sake of clarity only, operations performed at the nodes A and C pursuant to embodiments of the present disclosure are hereinafter elucidated with reference to the node A.

The node A determines, from a page identifier or a database key value included in the at least one page pre-fetch request, whether or not a database page identified by the page identifier or the database key value already exists in its buffer pool. If it is determined that the database page already exists in the buffer pool, there is no need to fetch the database page again. Optionally, in such a case, the node A ensures that the database page is not replaced by a newly-fetched database page until a replication write-set pertaining to a source transaction identifier included in the at least one page pre-fetch request is applied at the node A.

If it is determined that the database page does not exist in the buffer pool, the node A determines, from the source transaction identifier included in the at least one page pre-fetch request, whether or not a replication write-set pertaining to the source transaction identifier has already been applied at the node A. Optionally, in this regard, the node A maintains a lookup table of transactions that are already applied at the node A, wherein the lookup table stores source transaction identifiers of these transactions. The node A looks up for the source transaction identifier included in the at least one page pre-fetch request in the lookup table to determine whether or not the replication write-set pertaining to the source transaction identifier has already been applied at the node A.

If it is determined that the replication write-set pertaining to the source transaction identifier has already been applied at the node A, there is no need to fetch the database page into the buffer pool. Otherwise, if it is determined that the replication write-set pertaining to the source transaction identifier has not been applied yet at the node A, the node A pre-fetches the database page into its buffer pool (hereinafter referred to as "buffer pool pre-fetching"). Consequently, when the node A receives the replication write-set pertaining to the source transaction identifier in near future, the node A does not have to access the database page from its storage device.

Likewise, the node C performs the aforementioned operations as elucidated with reference to the node A.

It will be appreciated that the buffer pool pre-fetching is integrated in regular transaction replication and causes only a trivial overhead for the transaction replication itself. In a practical implementation, a progress of buffer pool pre-fetching can be monitored to diagnose an effect on an overall transaction throughput in the database cluster. Accordingly, the buffer pool pre-fetching can then be configured for an optimal progress.

In a third aspect, embodiments of the present disclosure provide a computing apparatus comprising:
 a processor;
 a memory coupled to the processor; and
 a network interface coupled to the processor,
 wherein the processor is configured to:
  receive a first transaction;
  generate a page pre-fetch request corresponding to the first transaction whilst executing the first transaction, wherein the page pre-fetch request is indicative of at least one database page that is referenced by the first transaction;
  add the page pre-fetch request to a replication write-set of a second transaction; and
  communicate the replication write-set of the second transaction, along with the page pre-fetch request, to at least one node of a database cluster.

According to an embodiment, the processor is configured to communicate a replication write-set of the first transaction to the at least one node of the database cluster, wherein the replication write-set of the first transaction is communicated after the replication write-set of the second transaction is communicated.

According to an embodiment, the page pre-fetch request comprises pre-fetch information and/or instructions for pre-fetching the at least one database page into a buffer pool. Optionally, the pre-fetch information and/or instructions comprise a page identifier of the at least one database page. Alternatively, optionally, the pre-fetch information and/or instructions comprise at least one database key value that identifies the at least one database page.

According to an embodiment, the page pre-fetch request comprises a source transaction identifier of the first transaction.

According to an embodiment, the processor is configured to:
 maintain a page pre-fetch cache, wherein the page pre-fetch cache stores page pre-fetch requests that are generated during execution of transactions received at the computing apparatus;
 fetch from the page pre-fetch cache at least one page pre-fetch request to be added to a replication write-set of a given transaction;
 add the at least one page pre-fetch request to the replication write-set of the given transaction; and
 communicate the replication write-set of the given transaction, along with the at least one page pre-fetch request, to the at least one node of the database cluster.

In a fourth aspect, embodiments of the present disclosure provide a computing apparatus comprising:
 a processor;
 a memory coupled to the processor; and
 a network interface coupled to the processor,
 wherein the processor is configured to:
  receive a page pre-fetch request corresponding to a first transaction along with a replication write-set of a second transaction;
  determine, from the page pre-fetch request, at least one database page that is referenced by the first transaction;
  determine whether or not the at least one database page already exists in a buffer pool; and
  pre-fetch the at least one database page into the buffer pool when the at least one database page does not exist in the buffer pool.

According to an embodiment, the page pre-fetch request comprises a source transaction identifier of the first transaction. In this embodiment, the processor is configured to determine, from the source transaction identifier of the first transaction, whether or not the first transaction is already applied at the computing apparatus. Correspondingly, the processor is configured to pre-fetch the at least one database page into the buffer pool when the first transaction has not been applied at the computing apparatus.

Optionally, in this regard, the processor is configured to:
 maintain a lookup table of transactions that are already applied at the computing apparatus, wherein the lookup table stores source transaction identifiers of the transactions that are already applied at the computing apparatus; and
 look up for the source transaction identifier of the first transaction in the lookup table to determine whether or not the first transaction is already applied at the computing apparatus.

According to an embodiment, the processor is configured to process the page pre-fetch request in a thread-safe manner.

Furthermore, an example of a computing apparatus has been provided in conjunction with FIG. 2 as explained in more detail below. The computing apparatus could be a database server, or a computing device dedicated to running processes associated with databases.

The computing apparatus includes, but is not limited to, a memory, a processor, a data storage, a network interface, and a power source.

The power source supplies electrical power to various components of the computing apparatus. The power source may, for example, include a rechargeable battery.

The memory optionally includes non-removable memory, removable memory, or a combination thereof. The non-removable memory, for example, includes Random-Access Memory (RAM), Read-Only Memory (ROM), flash memory, or a hard drive. The removable memory, for example, includes flash memory cards, memory sticks, or smart cards.

The data storage is a non-transitory data storage arrangement, for example, including a database.

The network interface optionally allows clients to access the computing apparatus, and perform read and/or write operations on the database.

Moreover, the network interface enables the computing apparatus to communicate with other computing apparatus, for example, via a communication network.

Moreover, the processor is configured to perform operations as described earlier.

Furthermore, embodiments of the present disclosure also provide a network environment in which a database cluster can be implemented. The network environment includes one or more clients, a plurality of nodes and a communication network. An example of such a network environment has been provided in conjunction with FIG. 1 as explained in more detail below.

The nodes may, for example, be database servers, processes associated with databases, or computing devices dedicated to running such processes. The nodes may be implemented in a manner that is similar to an implementation of the aforementioned computing apparatus.

The nodes may be installed at separate hardware or at same hardware. In an example, the nodes are optionally distributed geographically. In another example, the nodes are optionally implemented as a cloud service.

Optionally, the communication network couples some or all of the nodes in communication for exchanging data amongst the nodes.

Additionally or alternatively, optionally, some of the nodes are coupled in communication via another communication network that is isolated from the communication network.

Additionally or alternatively, optionally, some of the nodes are coupled in communication via non-network means, for example, such as Unix domain sockets.

The communication network can be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, and Worldwide Interoperability for Microwave Access (WiMAX) networks.

The communication network also provides a communication medium between the clients and the nodes. Consequently, the clients are operable to access the nodes via the communication network. In some examples, the clients are web services that allow users to access the nodes. Accordingly, the clients are optionally operable to perform read and/or write operations on the nodes.

In a fifth aspect, embodiments of the present disclosure provide a computer program product comprising a non-transitory machine-readable data storage medium having stored thereon program instructions that, when accessed by a processing device of a database cluster, cause the processing device to:

receive a first transaction;

generate a page pre-fetch request corresponding to the first transaction whilst executing the first transaction, wherein the page pre-fetch request is indicative of at least one database page that is referenced by the first transaction;

add the page pre-fetch request to a replication write-set of a second transaction; and communicate the replication write-set of the second transaction, along with the page pre-fetch request, to at least one node of the database cluster.

In a sixth aspect, embodiments of the present disclosure provide a computer program product comprising a non-transitory machine-readable data storage medium having stored thereon program instructions that, when accessed by a processing device of a database cluster, cause the processing device to:

receive a page pre-fetch request corresponding to a first transaction along with a replication write-set of a second transaction;

determine, from the page pre-fetch request, at least one database page that is referenced by the first transaction;

determine whether or not the at least one database page already exists in a buffer pool; and pre-fetch the at least one database page into the buffer pool when the at least one database page does not exist in the buffer pool.

DETAILED DESCRIPTION OF THE DRAWINGS

Referring now to the drawings, particularly by their reference numbers, FIG. 1 is a schematic illustration of an example network environment 100 in which a multi-master database cluster is implemented pursuant to embodiments of the present disclosure. The network environment 100 includes one or more clients, depicted as a client 102a, a client 102b and a client 102c. Additionally, the network environment 100 includes a plurality of nodes, depicted as a node 104a, a node 104b and a node 104c (hereinafter collectively referred to as nodes 104). The nodes 104 form the multi-master database cluster. The network environment 100 also includes one or more communication networks, depicted as a communication network 106.

FIG. 1 is merely an example, which should not unduly limit the scope of the claims herein. It is to be understood that the specific designation for the network environment 100 is provided as an example and is not to be construed as limiting the network environment 100 to specific numbers, types, or arrangements of clients, nodes and communication networks. A person skilled in the art will recognize many variations, alternatives, and modifications of embodiments of the present disclosure.

Figure 2:
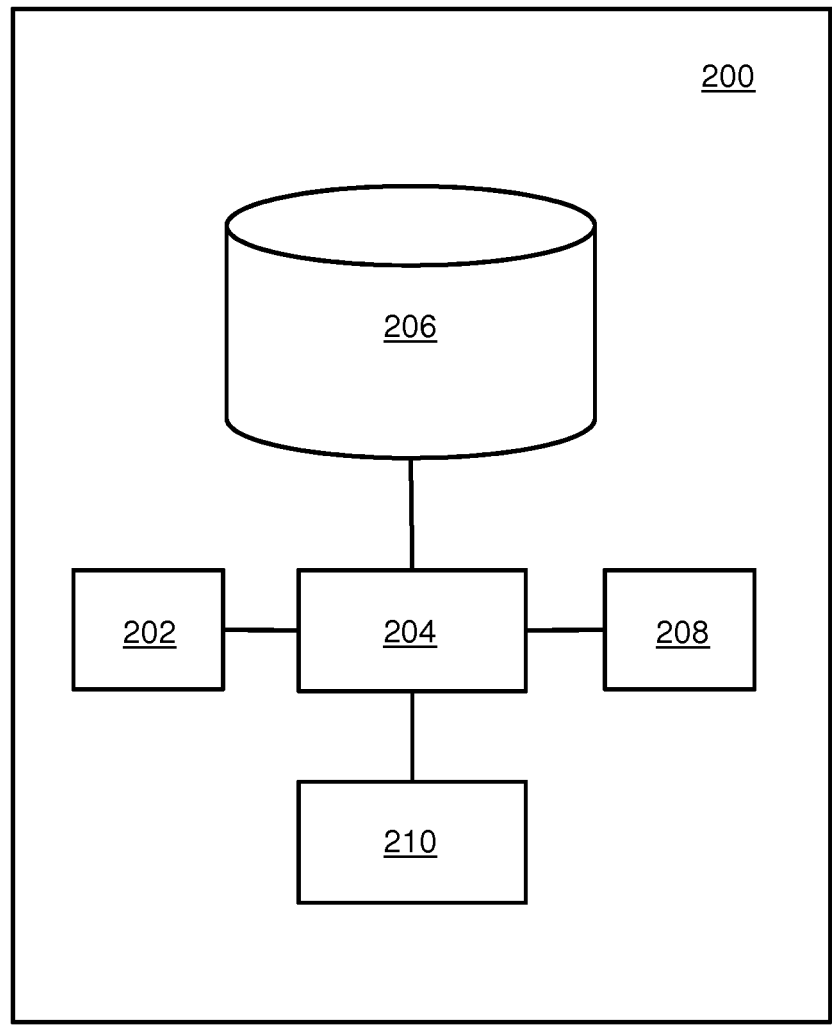
FIG. 2 is a schematic illustration of a computing apparatus for use in a database cluster, in accordance with an embodiment of the present disclosure.

FIG. 2 is a schematic illustration of a computing apparatus 200 for use in a database cluster, in accordance with an embodiment of the present disclosure. The computing apparatus 200 includes, but is not limited to, a memory 202, a processor 204, a data storage 206, a network interface 208, and a power source 210.

FIG. 2 is merely an example, which should not unduly limit the scope of the claims herein. It is to be understood that the specific designation for the computing apparatus 200 is provided as an example and is not to be construed as limiting the computing apparatus 200 to specific numbers, types, or arrangements of modules and/or components of the computing apparatus 200. A person skilled in the art will recognize many variations, alternatives, and modifications of embodiments of the present disclosure.

Figure 3:
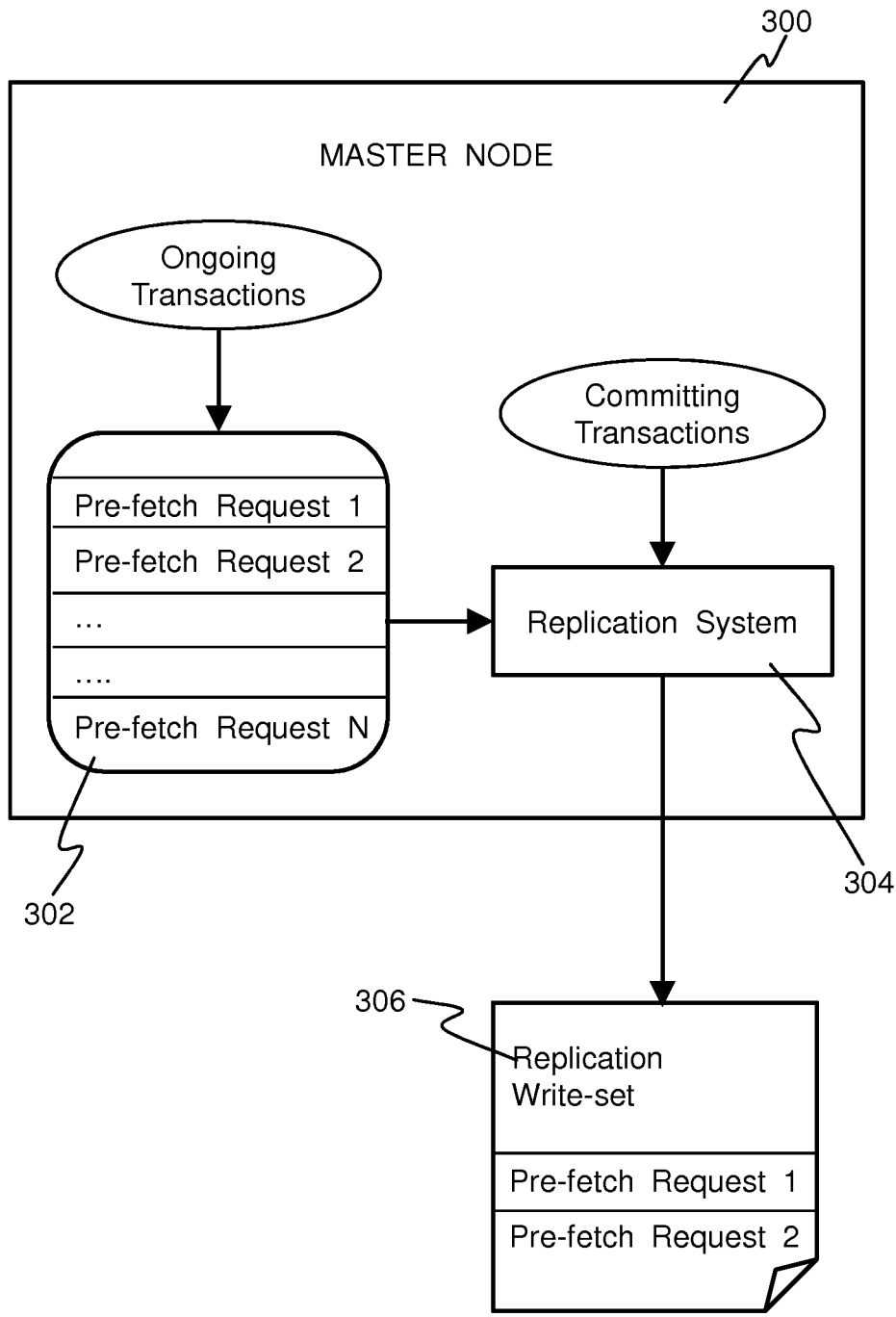
FIG. 3 is a schematic illustration of a processing performed at a master node, in accordance with an embodiment of the present disclosure.

FIG. 3 is a schematic illustration of a processing performed at a master node 300, in accordance with an embodiment of the present disclosure.

At the master node 300, page pre-fetch requests are generated for ongoing transactions, for example, whilst execution of the ongoing transactions. These page pre-fetch requests are stored at a page pre-fetch cache 302 maintained at the master node 300.

When a replication system 304 of the master node 300 creates a replication write-set of a transaction to be committed, the replication system 304 fetches at least one page pre-fetch request from the page pre-fetch cache 302 and adds the at least one page pre-fetch request to the replication write-set of the transaction to be committed. The replication system 304 then communicates the replication write-set along with the at least one page pre-fetch request to slave nodes.

Once the at least one page pre-fetch request is communicated to the slave nodes, the at least one page pre-fetch request is flushed from the page pre-fetch cache 302.

In FIG. 3, there is shown an example replication write-set 306 of a given transaction to which two page pre-fetch requests have been added. It is to be noted here that any number of page pre-fetch requests can be added to a single replication write-set.

FIG. 3 is merely an example, which should not unduly limit the scope of the claims herein. A person skilled in the art will recognize many variations, alternatives, and modifications of embodiments of the present disclosure.

Figure 4:
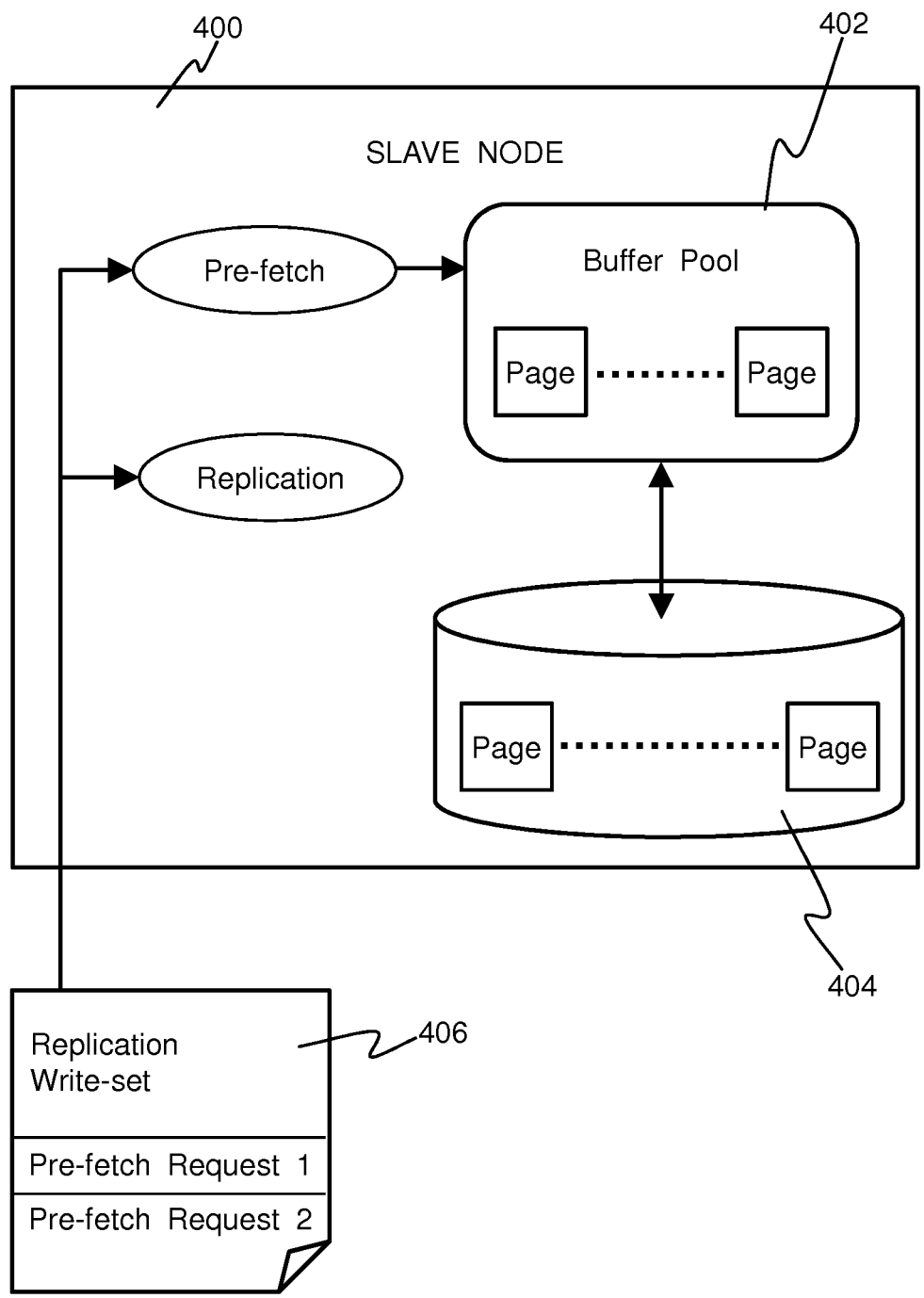
FIG. 4 is a schematic illustration of a processing performed at a slave node, in accordance with an embodiment of the present disclosure.

FIG. 4 is a schematic illustration of a processing performed at a slave node 400, in accordance with an embodiment of the present disclosure.

The slave node 400 maintains a buffer pool 402 in its memory for caching database pages, and includes a data storage 404 for storing database pages.

When the slave node 400 receives a replication write-set 406 along with at least one page pre-fetch request, the slave node 400 splits processing of replication events included in the replication write-set 406 and the at least one page pre-fetch request. In other words, the replication events and the at least one page pre-fetch request are processed in their own separate threads.

During the processing of the at least one page pre-fetch request, at least one database page is fetched from the data storage 404 into the buffer pool 402. As described earlier, the at least one database page is fetched into the buffer pool 402, when the at least one database page does not already exist in the buffer pool 402 and/or a transaction to which the at least one page pre-fetch request corresponds has not already applied at the slave node 400.

FIG. 4 is merely an example, which should not unduly limit the scope of the claims herein. A person skilled in the art will recognize many variations, alternatives, and modifications of embodiments of the present disclosure.

Figure 5A:
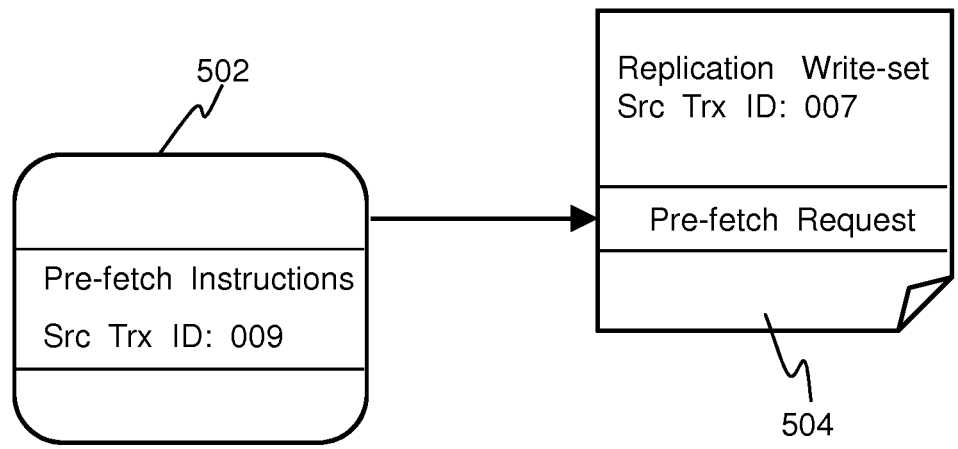
FIGS. 5A-B are schematic illustrations of processing performed at a master node and a slave node, respectively, in accordance with an embodiment of the present disclosure.
Figure 5B:
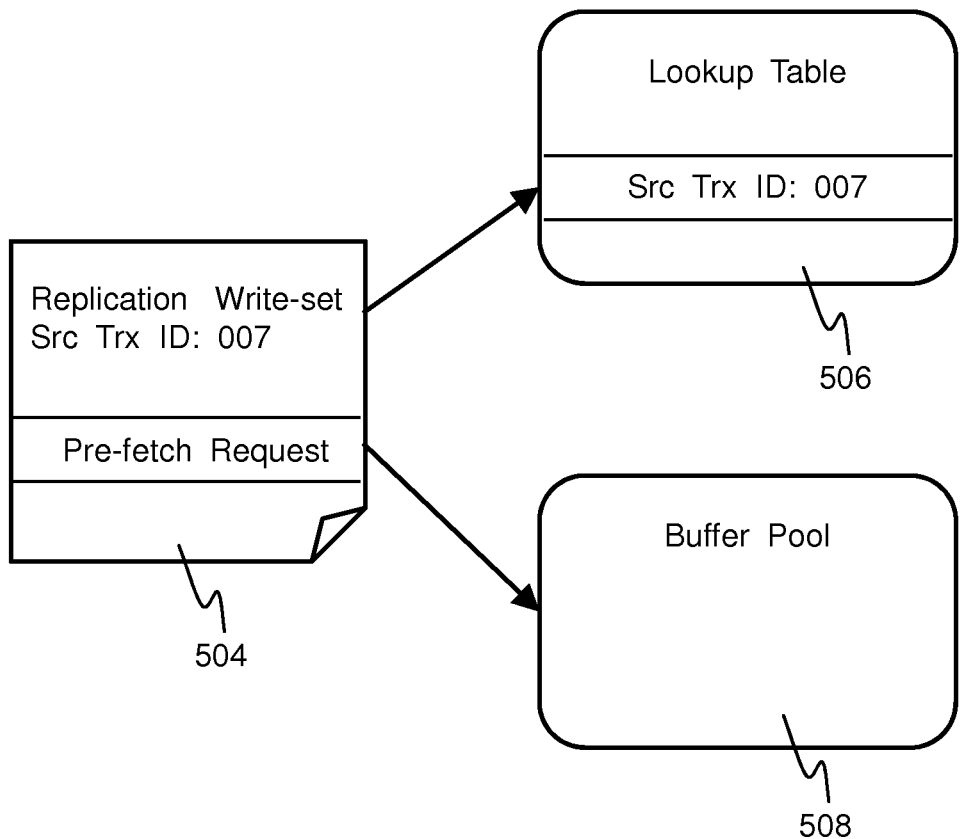

FIGS. 5A and 5B are schematic illustrations of processing performed at a master node and a slave node, respectively, in accordance with an embodiment of the present disclosure.

With reference to FIG. 5A, at the master node, a page pre-fetch request 502 including pre-fetch instructions and a source transaction identifier '009' is added to a replication write-set 504 of a given transaction with a source transaction identifier '007'. The master node communicates the replication write-set 504 including the page pre-fetch request 502 to the slave node.

With reference to FIG. 5B, at the slave node, the replication write-set 504 of the given transaction is applied. Subsequently, the source transaction identifier '007' is stored in a lookup table 506 of applied transactions that is maintained at the slave node.

In a case where the source transaction identifier '009' is not present in the lookup table 506, at least one database page as identified by the pre-fetch instructions included in the page pre-fetch request 502 is pre-fetched into a buffer pool 508 at the slave node.

FIG. 5 is merely an example, which should not unduly limit the scope of the claims herein. A person skilled in the art will recognize many variations, alternatives, and modifications of embodiments of the present disclosure.

Figure 6A:
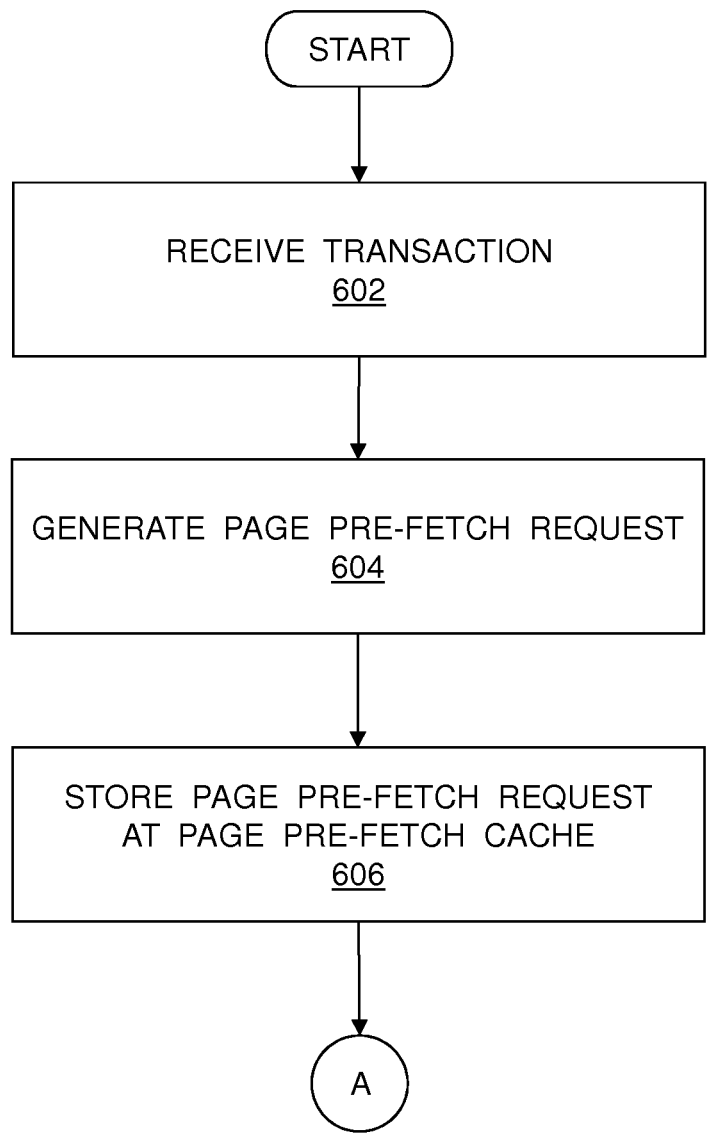
FIGS. 6A-B collectively are an illustration of steps of a method for use in a database cluster, in accordance with an embodiment of the present disclosure.
Figure 6B:
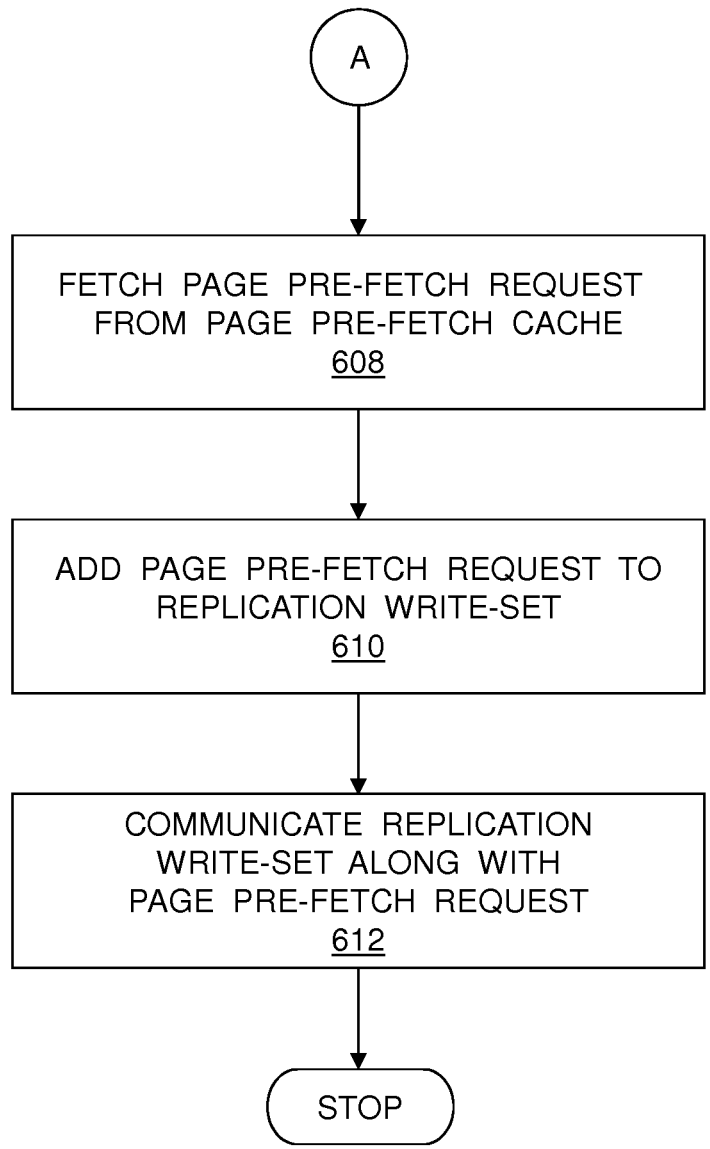

FIGS. 6A and 6B collectively are an illustration of steps of a method for use in a database cluster, in accordance with an embodiment of the present disclosure. The method is depicted as a collection of steps in a logical flow diagram, which represents a sequence of steps that can be implemented in hardware, software, or a combination thereof.

The database cluster includes a plurality of nodes. The nodes are coupled in communication, and are operable to exchange data amongst themselves.

At a step 602, a transaction is received at a given node of the database cluster.

At a step 604, a page pre-fetch request corresponding to the transaction is generated whilst executing the transaction at the given node.

At a step 606, the page pre-fetch request is stored at a page pre-fetch cache maintained at the given node.

The steps 604 and 606 are performed for all ongoing transactions at the given node, namely transactions that are in a query-processing state.

Meanwhile, at a step 608, when a replication write-set of a given transaction is being created, at least one page pre-fetch request is fetched from the page pre-fetch cache.

Subsequently, at a step 610, the at least one page pre-fetch request fetched at the step 608 is added to the replication write-set of the given transaction.

Next, at a step 612, the replication write-set of the given transaction along with the at least one page pre-fetch request is communicated to other nodes of the database cluster.

It should be noted here that the steps 602 to 612 are only illustrative and other alternatives can also be provided where one or more steps are added, one or more steps are removed, or one or more steps are provided in a different sequence without departing from the scope of the claims herein.

Figure 7A:
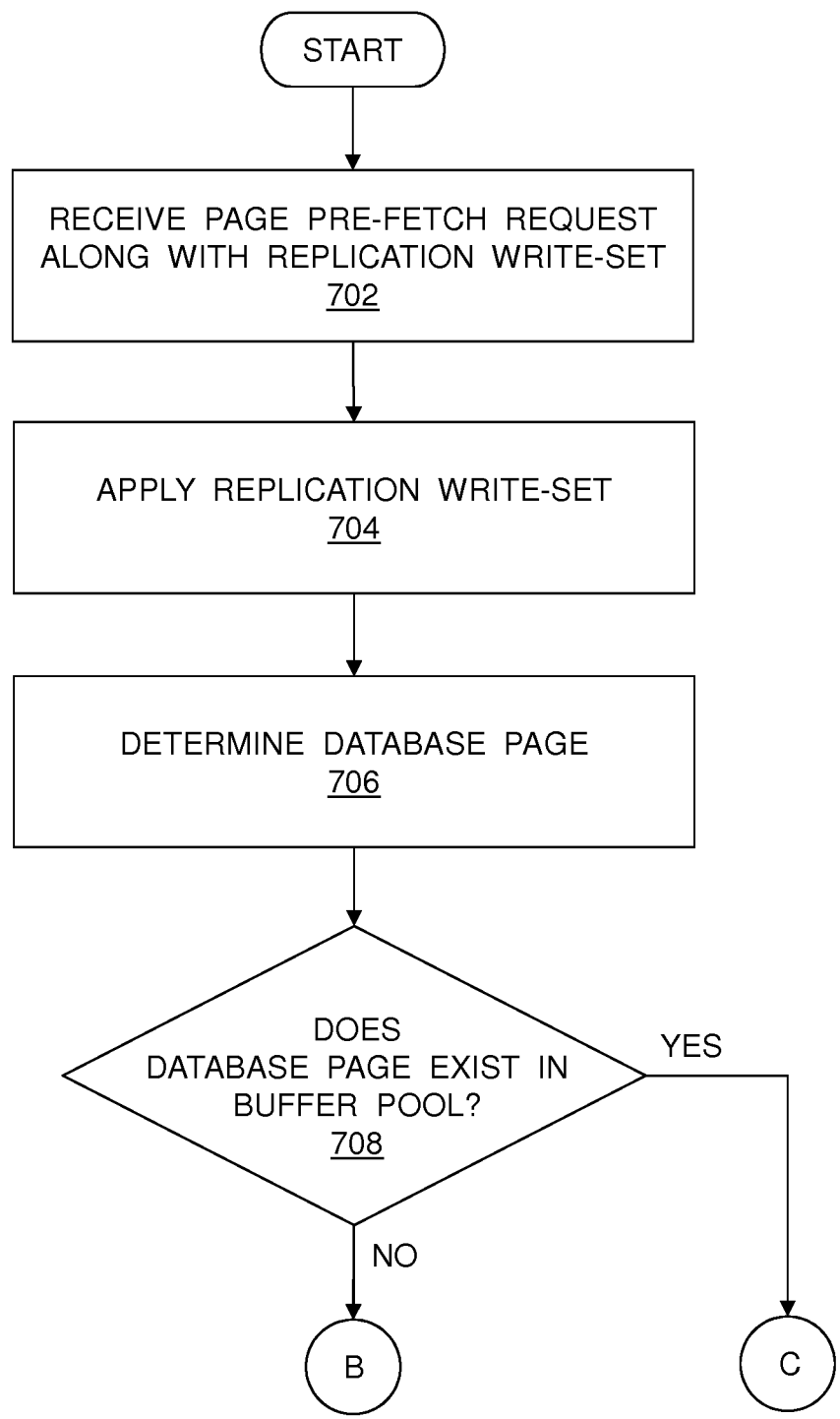
FIGS. 7A-B collectively are an illustration of steps of a method for use in a database cluster, in accordance with an embodiment of the present disclosure.
Figure 7B:
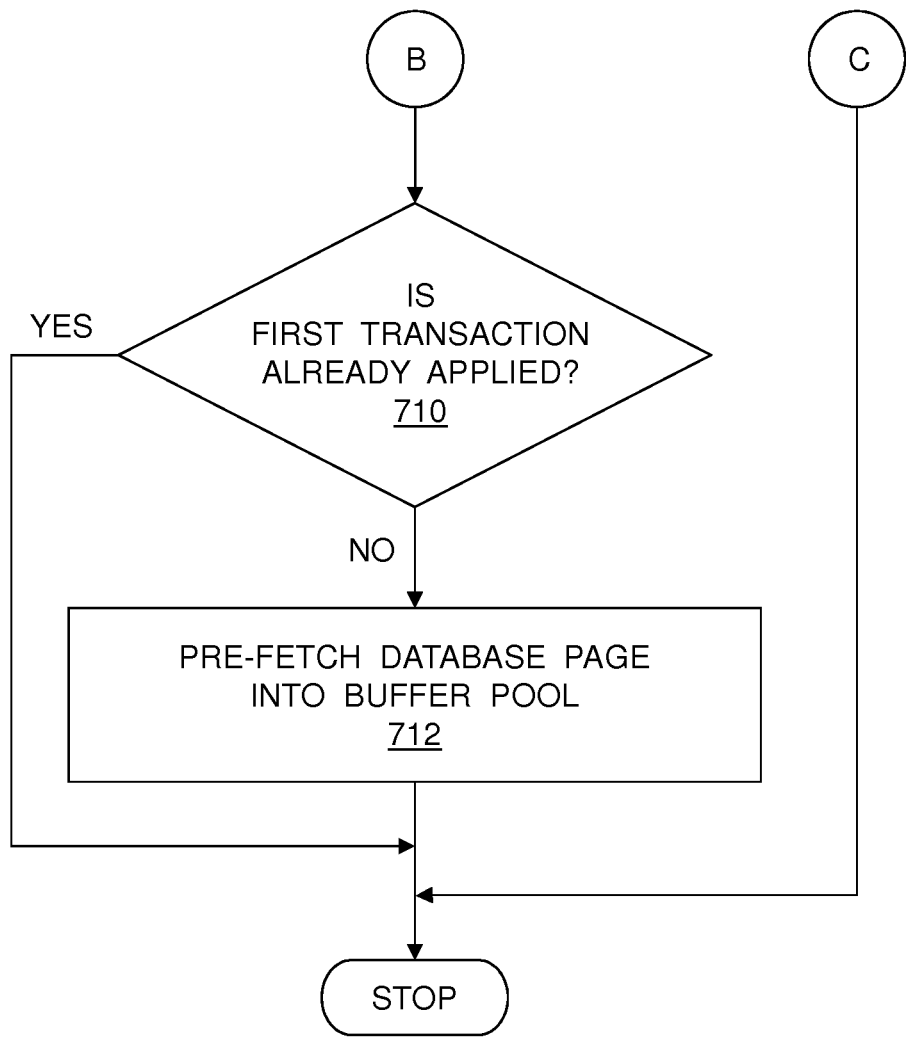

FIGS. 7A and 7B collectively are an illustration of steps of a method for use in a database cluster, in accordance with an embodiment of the present disclosure. The method is depicted as a collection of steps in a logical flow diagram, which represents a sequence of steps that can be implemented in hardware, software, or a combination thereof.

The database cluster includes a plurality of nodes. The nodes are coupled in communication, and are operable to exchange data amongst themselves.

At a step 702, a page pre-fetch request corresponding to a first transaction is received along with a replication write-set of a second transaction at a given node of the database cluster.

At a step 704, the replication write-set of the second transaction is applied at a database of the given node.

At a step 706, a database page referenced by the first transaction is determined from a page identifier or a database key value included in the page pre-fetch request.

At a step 708, it is determined whether or not the database page already exists in a buffer pool of the given node.

If, at the step 708, it is determined that the database page already exists in the buffer pool, the processing stops. Otherwise, if it is determined that the database page does not exist in the buffer pool, a step 710 is performed.

At the step 710, it is determined, from a source transaction identifier included in the page pre-fetch request, whether or not the first transaction has already been applied at the given node.

If, at the step 710, it is determined that the first transaction has already been applied at the given node, the processing stops. Otherwise, if it is determined that the first transaction has not been applied yet at the given node, a step 712 is performed.

At the step 712, the database page is pre-fetched into the buffer pool. As a result, when the given node receives the replication write-set pertaining to the source transaction identifier in near future, the given node does not have to access the database page from its storage device.

It should be noted here that the steps 702 to 712 are only illustrative and other alternatives can also be provided where one or more steps are added, one or more steps are removed, or one or more steps are provided in a different sequence without departing from the scope of the claims herein. As an example, the step 704 can be performed simultaneously with or after the steps 706 to 712. As another example, the step 710 can be performed simultaneously with or before the steps 706 and 708.

Embodiments of the present disclosure are susceptible to being used for various purposes, including, though not limited to, enabling slave nodes to pre-fetch database pages into their respective buffer pools for use in near future.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A method for use in a database cluster, wherein the database cluster comprises a plurality of nodes, the method comprising:
    receiving a first transaction at a first node of the database cluster;
    generating a page pre-fetch request corresponding to the first transaction whilst executing the first transaction at the first node, wherein the page pre-fetch request is indicative of at least one database page that is referenced by the first transaction;
    adding the page pre-fetch request to a replication write-set of a second transaction at the first node; and
    communicating the replication write-set of the second transaction, along with the page pre-fetch request, to a second node of the database cluster.

2. The method of claim 1, wherein the method further comprises communicating a replication write-set of the first transaction to the second node, wherein the replication write-set of the first transaction is communicated after the replication write-set of the second transaction is communicated.

3. The method of claim 1, wherein the page pre-fetch request comprises pre-fetch information and/or instructions for pre-fetching the at least one database page into a buffer pool.

4. The method of claim 3, wherein the pre-fetch information and/or instructions comprise a page identifier of the at least one database page.

5. The method of claim 3, wherein the pre-fetch information and/or instructions comprise at least one database key value that identifies the at least one database page.

6. The method of claim 1, wherein the page pre-fetch request comprises a source transaction identifier of the first transaction.

7. The method of claim 1, wherein the method further comprises:
    maintaining a page pre-fetch cache at the first node, wherein the page pre-fetch cache stores page pre-fetch requests that are generated during execution of transactions received at the first node;
    fetching from the page pre-fetch cache at least one page pre-fetch request to be added to a replication write-set of a given transaction;
    adding the at least one page pre-fetch request to the replication write-set of the given transaction; and
    communicating the replication write-set of the given transaction, along with the at least one page pre-fetch request, to the second node.

8. A method for use in a database cluster, wherein the database cluster comprises a plurality of nodes, the method comprising:
    receiving, at a second node of the database cluster, a page pre-fetch request corresponding to a first transaction along with a replication write-set of a second transaction;
    determining, from the page pre-fetch request, at least one database page that is referenced by the first transaction;
    determining whether or not the at least one database page already exists in a buffer pool at the second node; and
    pre-fetching the at least one database page into the buffer pool when the at least one database page does not exist in the buffer pool.

9. The method of claim 8, wherein the page pre-fetch request comprises a source transaction identifier of the first transaction, and the method further comprises determining, from the source transaction identifier of the first transaction, whether or not the first transaction is already applied at the second node, wherein the at least one database page is pre-fetched into the buffer pool when the first transaction has not been applied at the second node.

10. The method of claim 9, wherein the method further comprises:
    maintaining a lookup table of transactions that are already applied at the second node, wherein the lookup table stores source transaction identifiers of the transactions that are already applied at the second node; and
    looking up for the source transaction identifier of the first transaction in the lookup table to determine whether or not the first transaction is already applied at the second node.

11. The method of claim 8, wherein the method further comprises processing the page pre-fetch request in a thread-safe manner.

12. A computing apparatus comprising:
    a processor;
    a memory coupled to the processor; and
    a network interface coupled to the processor,
    wherein the processor is configured to:
        receive a first transaction;
        generate a page pre-fetch request corresponding to the first transaction whilst executing the first transaction, wherein the page pre-fetch request is indicative of at least one database page that is referenced by the first transaction;
        add the page pre-fetch request to a replication write-set of a second transaction; and
        communicate the replication write-set of the second transaction, along with the page pre-fetch request, to at least one node of a database cluster.

13. The apparatus of claim 12, wherein the processor is configured to communicate a replication write-set of the first transaction to the at least one node of the database cluster, wherein the replication write-set of the first transaction is communicated after the replication write-set of the second transaction is communicated.

14. The apparatus of claim 12, wherein the page pre-fetch request comprises pre-fetch information and/or instructions for pre-fetching the at least one database page into a buffer pool.

15. The apparatus of claim 14, wherein the pre-fetch information and/or instructions comprise a page identifier of the at least one database page.

16. The apparatus of claim 14, wherein the pre-fetch information and/or instructions comprise at least one database key value that identifies the at least one database page.

17. The apparatus of claim 12, wherein the page pre-fetch request comprises a source transaction identifier of the first transaction.

18. The apparatus of claim 12, wherein the processor is configured to:
  maintain a page pre-fetch cache, wherein the page pre-fetch cache stores page pre-fetch requests that are generated during execution of transactions received at the computing apparatus;
  fetch from the page pre-fetch cache at least one page pre-fetch request to be added to a replication write-set of a given transaction;
  add the at least one page pre-fetch request to the replication write-set of the given transaction; and
  communicate the replication write-set of the given transaction, along with the at least one page pre-fetch request, to the at least one node of the database cluster.

19. A computing apparatus comprising:
  a processor;
  a memory coupled to the processor; and
  a network interface coupled to the processor,
  wherein the processor is configured to:
    receive a page pre-fetch request corresponding to a first transaction along with a replication write-set of a second transaction;
    determine, from the page pre-fetch request, at least one database page that is referenced by the first transaction;
    determine whether or not the at least one database page already exists in a buffer pool; and
    pre-fetch the at least one database page into the buffer pool when the at least one database page does not exist in the buffer pool.

20. The apparatus of claim 19, wherein the page pre-fetch request comprises a source transaction identifier of the first transaction, and the processor is configured to:
  determine, from the source transaction identifier of the first transaction, whether or not the first transaction is already applied at the computing apparatus; and
  pre-fetch the at least one database page into the buffer pool when the first transaction has not been applied at the computing apparatus.

21. The apparatus of claim 20, wherein the processor is configured to:
  maintain a lookup table of transactions that are already applied at the computing apparatus, wherein the lookup table stores source transaction identifiers of the transactions that are already applied at the computing apparatus; and
  look up for the source transaction identifier of the first transaction in the lookup table to determine whether or not the first transaction is already applied at the computing apparatus.

22. The apparatus of claim 19, wherein the processor is configured to process the page pre-fetch request in a thread-safe manner.

23. A computer program product comprising a non-transitory machine-readable data storage medium having stored thereon program instructions that, when accessed by a processing device of a database cluster, cause the processing device to:
  receive a first transaction;
  generate a page pre-fetch request corresponding to the first transaction whilst executing the first transaction, wherein the page pre-fetch request is indicative of at least one database page that is referenced by the first transaction;
  add the page pre-fetch request to a replication write-set of a second transaction; and
  communicate the replication write-set of the second transaction, along with the page pre-fetch request, to at least one node of the database cluster.

\* \* \* \* \*